April 1, 1924.  1,488,684
A. KASSLER
SHAFT OPERATING MECHANISM
Original Filed April 30, 1920   2 Sheets-Sheet 1
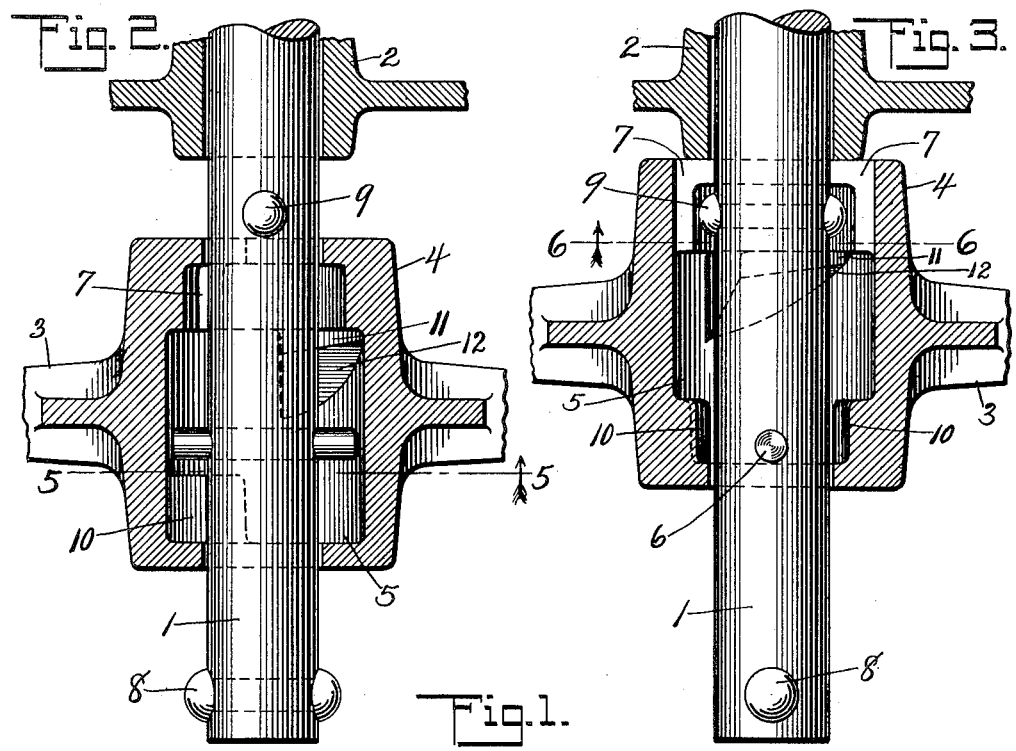
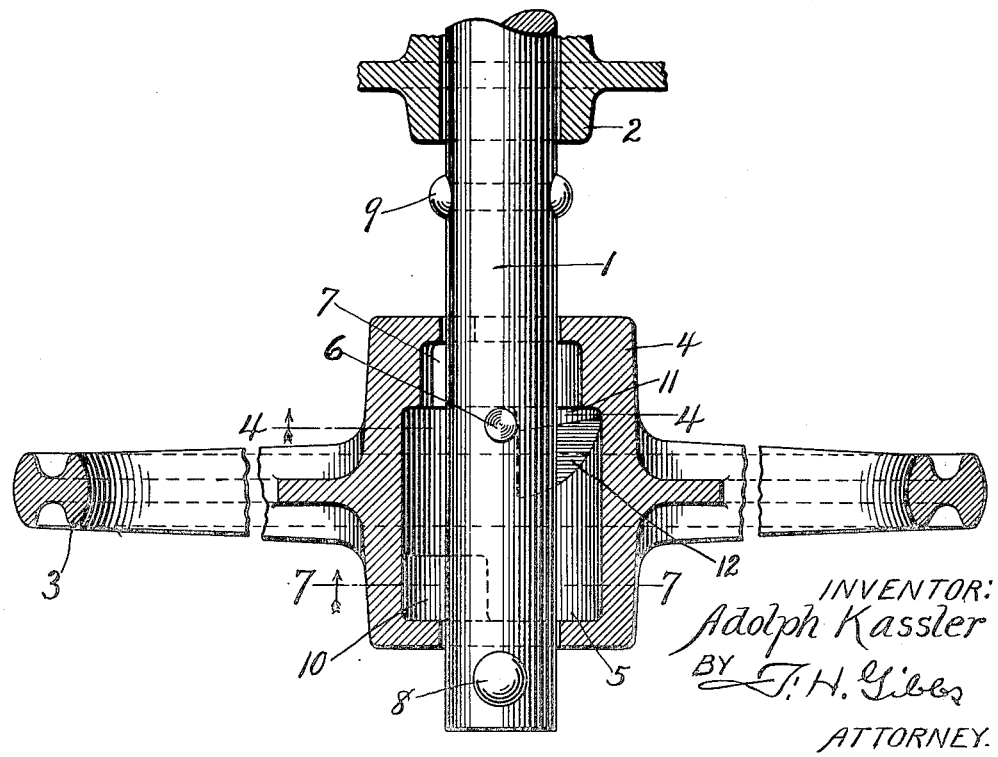
INVENTOR:
Adolph Kassler
BY T. H. Gibbs
ATTORNEY.

April 1, 1924.

A. KASSLER 1,488,684

SHAFT OPERATING MECHANISM

Original Filed April 30, 1920  2 Sheets-Sheet 2

INVENTOR:
Adolph Kassler
BY J. H. Gibbs
ATTORNEY.

Patented Apr. 1, 1924.

1,488,684

UNITED STATES PATENT OFFICE.

ADOLPH KASSLER, OF NEW YORK, N. Y., ASSIGNOR TO AMERICAN CAR AND FOUNDRY COMPANY, OF NEW YORK, N. Y., A CORPORATION OF NEW JERSEY.

SHAFT-OPERATING MECHANISM.

Original application filed April 30, 1920, Serial No. 377,811. Divided and this application filed March 28, 1921. Serial No. 456,379.

*To all whom it may concern:*

Be it known that I, ADOLPH KASSLER, residing at New York, in the county and State of New York, and being a citizen of the United States, have invented certain new and useful Improvements in a Shaft-Operating Mechanism, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof within the scope of the claims will occur to persons skilled in the art.

In said drawings:

Figure 1 is a section, taken on the line 1—1 of Figs. 4 and 7, of my improved shaft operating mechanism showing it in one of its engaging positions;

Figure 2 is a section taken on line 2—2 of Fig. 5 showing the device in its free or disengaged position;

Figure 3 is a section taken on line 3—3 of Fig. 6 showing the device in its other engaging position;

It is the object of my invention to provide an improved shaft operating means adapted to furnish a positive drive for the shaft in either direction and to disengage the operating means from the shaft and permit the shaft to rotate freely when the shaft rotates faster than the operating means in one direction.

Figure 6:
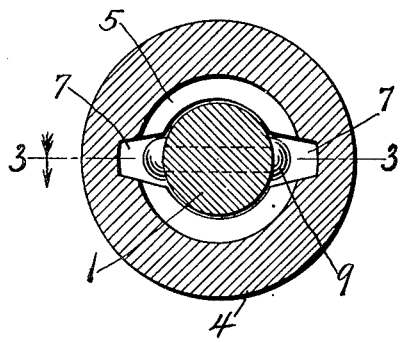
Figure 6 is a section taken on the line 6—6 of Fig. 3.

In the embodiment of my invention shown in the drawings, 1 designates a shaft adapted to rotate in suitable bearings or supports 2. Mounted on the shaft 1 is a shaft operating means or wheel 3 having a hub 4 provided with an opening forming a chamber 5 adapted to receive the shaft 1. The chamber 5 is of general cylindrical shape and of sufficient diameter to receive the pin 6 fixed in the shaft 1. The inner end of the hub 4 is slotted, as at 7 in Fig. 6, to permit the passage of the pin 6 and the outer end of the hub is bored to permit the end of the shaft to pass therethrough. After the wheel 3 is mounted on the shaft a pin 8 is passed through the shaft and its ends headed to prevent the withdrawal of the wheel from the shaft. Similar pins 9 serve to keep the shaft 1 in position in its bearings 2.

At the ends of the chamber 5 are inwardly extending projectings or shoulders 10 and 11, the projections 10 having their outer faces perpendicular to the hub axis while the projections 11 are each provided with an inclined face 12 extending from the base of the projection to the outer edge of the front or engaging face of the projection or shoulder. The projections 10 and 11 are adapted to be engaged with the pin 6 and thus provide a means for rotating the shaft 1 in either direction by the wheel 3.

Figure 4:
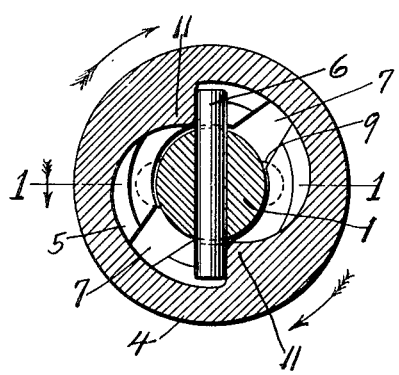
Figure 4 is a section taken on the line 4—4 of Fig. 1.
Figure 5:
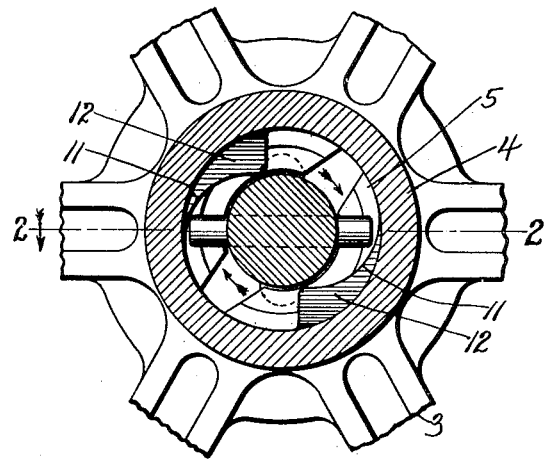
Figure 5 is a section taken on the line 5—5 of Fig. 2.
Figure 7:
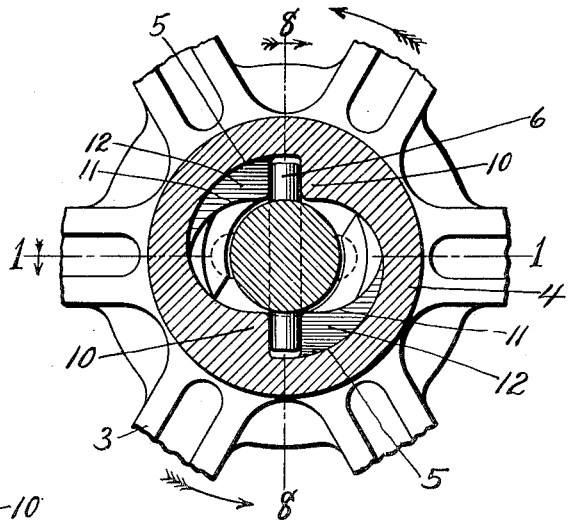
Figure 7 is a section taken on the line 7—7 of Fig. 1.
Figure 8:
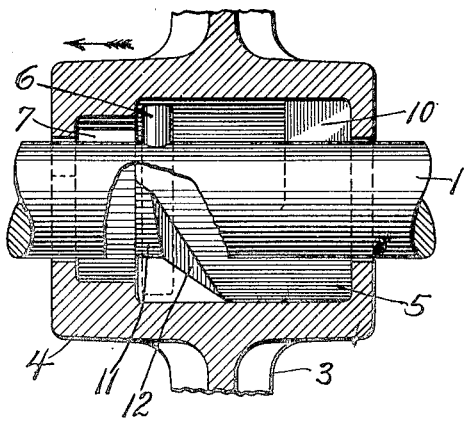
Figure 8 is a section taken on the line 8—8 of Fig. 7, part of the shaft being broken away to show the shaft engaging lug on the wheel hub.

To operate the shaft 1, the wheel 3 may be moved inwardly manually on the shaft 1 so as to bring the projections 10 into engagement with the pin 6 to rotate the shaft 1 in a counter-clockwise direction, as shown in Fig. 7, or the wheel 3 may be moved outwardly manually on the shaft 1 to engage the projections 11 with the pin 6 to rotate the shaft 1 in a clockwise direction, as shown in Fig. 4. When the projections 11 are in engagement with the pin 6 any increase in the speed of the shaft 1 or any reversal of the direction of rotation of the wheel 3 will cause the pin 6 to engage with the inclined faces 12 of the projections 11 and to automatically shift the wheel 3 along the shaft 1 to a position in which the pin 6 will not engage either the projections 11 or the projections 10 so that the shaft may revolve freely relatively to the wheel 3 and the wheel 3 may have its direction of rotation changed without stopping the rotation of the shaft 1.

This application is a division of my co-pending application, Serial No. 377,811, filed April 30, 1920, which resulted in Patent No. 1,415,097, issued May 9, 1922,

What I claim is:

1. A shaft, shaft operating means mounted on said shaft having a chambered hub and engaging means in said hub chamber adapted to rotate said shaft in either direction, said engaging means being adapted to shift said operating means on said shaft to a position in which said operating means rotates freely on said shaft in either direction.

2. A shaft, shaft operating means having a chambered hub movable longitudinally of said shaft and having shaft engaging means formed in said hub chamber, said shaft engaging means being adapted, in one position, to rotate said shaft in one direction, in another position to rotate said shaft in the other direction and to permit free rotation of said shaft in either direction in a third position, said shaft being adapted to engage said shaft engaging means to move said operating means to the third position from one of the other positions.

3. A shaft, shaft operating means having a chambered hub mounted on said shaft, shaft engaging means formed in said hub chamber and adapted to rotate said shaft in either direction and means on said shaft adapted to engage said shaft engaging means to shift said operating means along said shaft to a position in which said shaft may rotate freely in said operating means.

4. A shaft, operating means for said shaft having a chambered hub and engaging means on said shaft and in said hub chamber adapted to engage to rotate said shaft in one direction and to engage to shift said operating means along said shaft to a position in which said shaft may rotate freely in either direction with respect to said operating means.

5. A shaft, operating means movable on said shaft and having a chambered hub and engaging means on said shaft and in said hub chamber adapted, in one position of said operating means, to engage to rotate said shaft in one direction, in a second position, to engage to rotate said shaft in the opposite direction and to engage in one of said positions to shift said operating means along said shaft to a position in which said shaft may rotate freely in said operating means.

6. A shaft having engaging means thereon, operating means for said shaft having a chambered hub and movable longitudinally of said shaft, means in said hub chamber adapted to engage the means on said shaft to rotate the shaft in one direction, said means being adapted to engage to shift said operating means along said shaft to a position in which said shaft may rotate freely in either direction in said hub.

7. A shaft having engaging means thereon, operating means for said shaft having a chambered hub and movable longitudinally of said shaft and means in said hub chamber adapted to engage the engaging means on said shaft to rotate said shaft in either direction, said means being adapted in one position of said operating means, to be engaged by said engaging means to shift said operating means to a position in which said shaft may rotate freely in said hub.

8. A shaft having engaging means thereon, operating means for said shaft having a chambered hub and movable longitudinally of said shaft, projections in said hub chamber adapted to engage said engaging means in one position of said operating means to rotate said shaft in one direction and to engage said engaging means in another position to rotate said shaft in the other direction, said projections being adapted, in one of said positions, to be engaged by said engaging means to shift said operating means to a position in which said shaft may rotate freely in said hub.

In witness whereof I have hereunto set my hand in the presence of two witnesses.

ADOLPH KASSLER.

Witnesses:
JOHN B. D. THOMPSON,
NELSON W. BLOSS.